United States Patent [19]

Kozischek et al.

[11] 4,430,155
[45] Feb. 7, 1984

[54] PRODUCTION OF MACROSPHERICAL PARTICLES

[75] Inventors: James F. Kozischek, Belvidere; M. Donner Martin, Jr., Denville, both of N.J.

[73] Assignee: Armour Pharmaceutical Company, Berkeley Heights, N.J.

[21] Appl. No.: 388,576

[22] Filed: Jun. 15, 1982

Related U.S. Application Data

[63] Continuation of Ser. No. 226,311, Jan. 21, 1981, abandoned.

[51] Int. Cl.³ .................... B01D 1/18; B01D 1/20; B05B 1/34; B05B 3/10
[52] U.S. Cl. ...................... 159/4 S; 159/48.1; 239/223
[58] Field of Search ............ 159/4 R, 4 S, 9 R, 10, 159/48 R, 48 L, 16 R, 6 R; 202/236; 239/219, 223

[56] References Cited

U.S. PATENT DOCUMENTS

| | | |
|---|---|---|
| 1,352,623 | 9/1920 | Perry . |
| 1,456,046 | 5/1923 | Ball ............................ 159/4 S R |
| 1,724,627 | 8/1929 | Varnau et al. ................ 159/4 S |
| 2,043,378 | 6/1936 | Igarashi et al. . |
| 2,599,451 | 6/1952 | Hickman et al. ............. 159/6 R |
| 2,829,710 | 4/1958 | Paasch . |
| 2,831,652 | 4/1958 | Gemperle et al. . |
| 2,862,511 | 12/1958 | Forsberg ....................... 239/223 |
| 3,039,890 | 6/1962 | Reindl ........................... 239/223 |
| 3,259,171 | 7/1966 | Siemssen . |
| 3,442,317 | 5/1969 | Wieland ......................... 159/4 S |
| 4,089,120 | 5/1978 | Kozischek . |

OTHER PUBLICATIONS

Marshall, Jr., W. R., "Automization and Spray Drying," Chemical Engineering Progress Monograph Series, No. 2, vol. 50, 1954.

*Primary Examiner*—Bradley Garris
*Attorney, Agent, or Firm*—Panitch, Schwarze, Jacobs & Nadel

[57] ABSTRACT

A process and improved apparatus are provided for producing macrospherical particles. The particles themselves have increased wall thicknesses and higher densities than particles produced by conventional means and are thus not subject to deep lung penetration. The produced particles are also of controlled (narrow) particle size distribution. Such particles are particularly well adapted for use as anti-perspirants. The process for producing the particles comprises providing a solution containing the materials from which the particles are made, dispersing the solution along a plurality of radially disposed bristles by centrifugal force into discrete liquid droplets and drying the solution droplets in a stream of heated air. The improved apparatus comprises mounting a rotatable atomizer having a plurality of bristles inside a spray drying chamber.

8 Claims, 6 Drawing Figures

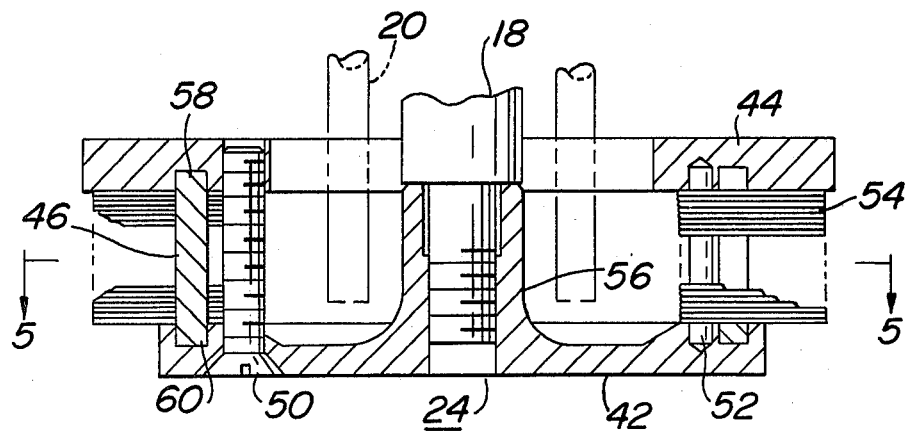
FIG. 4
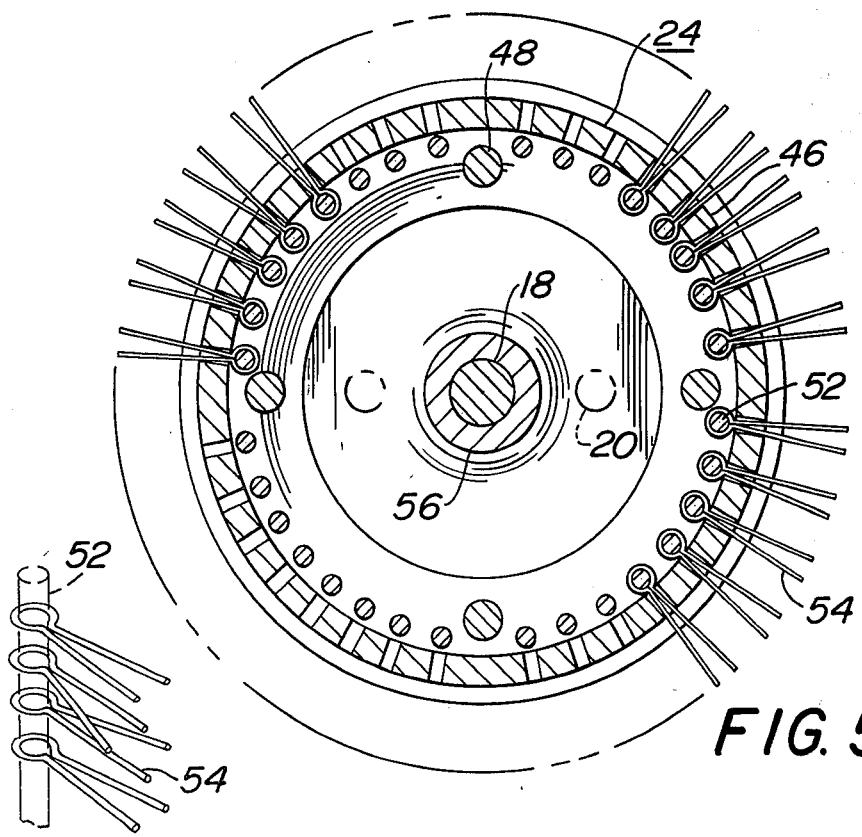
FIG. 5
FIG. 6

PRODUCTION OF MACROSPHERICAL PARTICLES

CROSS-REFERENCE TO RELATED APPLICATION

This application is a continuation application of our copending patent application Ser. No. 226,311, filed Jan. 21, 1981 and now abandoned.

BACKGROUND OF THE INVENTION

This invention pertains to the production of thick-walled macrospherical particles particularly useful as anti-perspirants or antacid powders. The macrospherical particles produced by this invention are not limited to anti-perspirants or antacids, but may also include pigments, resins, catalysts, etc.

For the last 10 or 15 years, aerosol sprays have been a major application form for many products such as hair spray, paint, anti-perspirant powders, and countless others. For the purposes of this application, "aerosol" means a suspension of fine solid particles in a gas. The gas need not be halohydrocarbons such as Freon which have been widely used as propellants, but may include air or any other gaseous propellant.

In one article, Cambridge, G. W., "Inhalation Toxicity Studes," AEROSOL AGE, May 1973, 32, the author focused on the current public and regulatory awareness to pulmonary deposition and possible retention of inhaled aerosol products. The study pointed out that, while penetration into and deposition in the respiratory tract is influenced to some extent by the frequency and depth of breathing, the major factor is the size and shape of the particle representing inhaled particulate matter. The nose, as the primary filter, retains virtually all particles in excess of 10 microns in diameter. Approximately 50% of 5 micron particles penetrate beyond the nose. Particles below 5 microns are respirable and will penetrate into the lung if the particles are of unit or lower density.

Hatch, T. F. and Gross, P., PULMONARY DEPOSITION AND RETENTION OF INHALED AEROSOLS, Academic Press, N.Y., 1964, define aerodynamic particle size as "the diameter of a unit density sphere having the same settling velocity as a particle in question of whatever shape and density." These authors have shown that the degree of respiratory penetration and retention is a direct function of the aerodynamic particle size. In effect, the denser a particle, the less respirable it is, even at particle diameters of less than 10 microns, if the density is of a high order of magnitude.

Sciarra, J. J., McGinley, P., and Izzo, L., "Determination of Particle Size Distribution of Selected Aerosol Cosmetics, I. Hair Sprays," J. SOC. COSM. CHEM. 20, 385–394, May 27, 1969, reported that while most particles below 50 microns will remain suspended in air for relatively long periods of time, only those particles less than 10 microns are likely to pass into the respiratory tract. Most of the particles of this size will be retained in the upper portions of the respiratory tract, while particles in the range 2–5 microns may be deposited in the area of terminal bronchi and alveoli.

Thus, it is apparent that certain particles suspended in an aerosol may be harmful to the respiratory system. In view of this and for other pertinent objectives, the present invention and that of U.S. Pat. Nos. 4,089,120 and 4,147,766 were developed. The particles of these inventions are macrospherical particles having increased wall thicknesses and higher densities than particles produced by conventional means. These particles are of a large enough size and density to be substantially filtered out by the nose and to avoid deep respiratory tract penetration and deposition.

Prior art particles have either been so small that they have been respired and retained in the lungs, or have been so large that the various valves, dip tubes and orifices of aerosol sprayers become clogged due to agglomeration in the very small openings through which the compositions must pass. This tendency to agglomeration has made it necessary to grind or mill the particles prior to its formulation as a suspension, but even with such prior treatment, agglomeration has continued to be a problem.

It has been reported in DRUG & COSMETIC INDUSTRY, September, 1975, p. 132, that some companies "are attempting to side-step the problem of zirconium inhalation by reformulating their aerosol anti-perspirants to limit spray particles to more than 10 microns, a feat aerosol veterans say may be especially difficult because of shearing and break-up in the upper valve and in the actuator."

U.S. Pat. No. 3,887,692, issued to the assignee of the present application, discloses basic aluminum halides in microspherical form and aerosol anti-perspirant compositions containing them, as well as processes for preparing the halides in microspherical form. Such microspheres, while uniformly spheroidal in shape, are solid, and thus require more material to make them.

The microspheres disclosed in U.S. Pat. No. 3,887,692 are made by a process in which an aqueous solution of the basic aluminum halides is discharged through a hollow tube or needle in a fine stream against the side of a vortex or whirling organic alcohol. As the vortex whirls, the very fine droplets of the halide assume sperical form. They are then separated from the alcohol and incorporated in an aerosol anti-perspirant composition.

There are several centrifugal particle forming and drying processes and apparatus known in the prior art. See, for example, U.S. Pat. Nos. 1,352,623; 2,043,378; and 3,259,171. The last-mentioned patent discloses a slinger for forming particles to be spray dried. The slinger comprises a screen having a multiplicity of openings through which clay is extruded by centrifugal force, which is used as feed stock. While the patent discloses that the particles are of substantially the same size and shape, they are not hollow nor are they spherical. The particles produced do not have a diameter substantially larger than the openings in the screen.

The above-mentioned patent also disclose apparatus for producing particles by centrifugal force. None, however, teach the dispersion of a solution along a plurality of bristles to produce macrospherical particles in accordance with the present invention.

U.S. Pat. No.2,829,710 discloses an atomizing dryer but of a substantially different structure than that of the present invention.

Beeco Products Company sells a series of spray head atomizers designated as BEECOMIST spray heads. These devices use controlled-porosity sintered-metal sleeves for spraying fluids, usually liquid solutions for the control of agricultural pests and diseases using droplets from 10 to 100 microns in diameter. The BEECOMIST spray heads are generally mounted on crop dusting aircraft or carried on farm land vehicles, rather than being placed in a spray drying apparatus.

Conventional spray dryers use an atomizer which is simply a spinning plate which has the liquid solution fed in streams to the underside of the plate. The liquid is spun off the plate by centrifugal force resulting in the formation of liquid droplets which are then dried in midair by a hot air stream. See Bulletin 33-3 of Bowen Engineering, Inc., North Branch, N.J. for a description of a conventional spray drying system. Another conventional spray drying apparatus comprises a drilled hole atomizer which includes a cylindrical or basket-like structure for receiving the solution and drilled holes of about 3/16 inch diameter, for example, in the peripheral walls to allow jets of solution to escape into the drying chamber. Both of these conventional methods rely essentially on hydrodynamic centrifugal atomization by the Rayleigh jet break-up phenomenon. Such conventional system do not produce macrospherical particles such as those disclosed in the present application.

U.S. Pat. No. 2,862,511 concerns an apparatus for applying liquid to granular materials such as seeds and the like. The apparatus utilizes a wire brush to produce a liquid mist to coat seeds. This patent, however, does not teach or suggest the producing of macrospherical particles of controlled particle size distribution, but instead describes the treating, i.e. coating, of particles previously formed by other means.

U.S. Pat. No. 3,039,890 relates to a method and apparatus for electrostatic spraying of liquid coating material, such as paint, utilizing one or more bristles. The bristles described in this patent serve as elongated electrodes. This patent does not concern the forming of thick-walled macrospherical particles of controlled particle size distribution or the use of spray drying techniques.

FIG. 6 of U.S. Pat. No. 3,039,890 shows paint feeding apertures 46 *between* each pair of U-bristles 44. The paint thereof cannot flow along the entire surface of each bristle, but rather is thrown against the bristles by centrifugal action.

U.S. Pat. Nos. 4,089,120 and 4,147,766, issued to the same assignee as the present application, refer respectively to a novel process and apparatus for the production of microspherical particles and to novel macrospherical particles. The process described in U.S. Pat. No. 4,089,120 for producing marcospherical particles comprises providing a solution containing the materials from which the particles are made, diffusing the solution through small pores by centrifugal force such that the resulting hollow particles have a diameter greater than the pore diameter, and drying the solution droplets in a stream of heated air. The apparatus described in U.S. Pat. No. 4,089,120 for producing macrospherical particles comprises a centrifugal atomizer having a porous sintered metal filter ring which is rotated inside a spray drying chamber.

SUMMARY OF THE INVENTION

There has now been discovered a process and an improved apparatus for producing macrospherical particles of controlled particle size distribution having increased wall thicknesses and higher densities than comparable particles produced by previously known means. Such process and apparatus provide for the production of discrete droplets of relatively narrow particle size distribution.

The controlled particle size distribution afforded by this invention results in very few fine particles and very few heavy particles. The particle size distribution available is thus narrow, with the vast majority of particles being in the medium diameter size range of between about 10 microns to about 64 microns. Fine particles, e.g., 5-6 microns, are undesirable because of their hazardous effect on the respiratory system; heavy particles are undesirable due to their unattractive nature as well as their tendency to block nozzles and cause associated problems. Thus for a given peripheral speed, the use of the subject invention will generally result in a narrower particle size distribution when compared to conventional atomizers such as multiple vane, porous metal, etc.

The process of this invkention for producing dry, thick-walled macrospherical particles of controlled particle size distribution comprises providing a solution containing the material from which the particles are made, dispersing the solution through a plurality of radially disposed bristles by centrifugal force to form discrete liquid droplets and drying the droplets in a stream of heated gas after they leave the free ends of the bristles.

The improved apparatus of this invention for producing particles from a solution containing material from which the particles are made comprises a centrifugal atomizer having an atomizer head and driving means for the atomizer heads. The atomizer head comprises one or more fluid inlets, one or more fluid outlets and a plurality of bristles extending radially out from each of said fluid outlets. The driving means is attached to the atomizer head and serves to rotate the atomizer head at high peripheral speeds. The atomizer is mounted in a spray drying chamber to produce dry, thick-walled macrospherical particles of controlled particle size distribution.

At this point, it is important to define the term "macrospherical particles" as used herein and to distinguish these from the microspherical particles of the prior art. A. M. Rubino, "'Microspherical Powder' Aerosol Antiperspirant systems," AEROSOL AGE, Vol. 19, No. 5, pages 21-25 (May 1974) describes microspherical antiperspirants which comprise hollow spherical particles confined to a relatively narrow range, namely 70% or more of the partivles having diameters between about 15 and 44 microns diameter and particles larger than 45 microns diameter and particles smaller than 5 to 10 microns being minimized. This microspherical particle size distribution is obtained by mechanical classification of the particles after spray drying. The particles have an apparent density of about 0.8 gm/ml.

The macrospherical particles of the present invention are formed directly by spray drying without a subsequent mechanical classification to remove larger particles. These macrospherical particles are relatively thick-walled and have a density greater than 1.0, and typically about twice as great as the microspherical grade. This latter characteristic was quite unexpected and is advantageous because of the greater "apparent size" according to the unit density theory of Hatch and Gross, supra.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 4 is a side elevational view of another embodiment of the atomizer head according to the present invention, as it is mounted in the center of the top of the spray drying chamber. In this embodiment, the fluid outlets are slots. Adjacent to each outlet is a post having a plurality of fibers wrapped around the post with each wrapped fiber stacked one on top of another.

FIG. 5 is a plan view of the atomizer head of FIG. 4 taken in section along line 5—5 of FIG. 4.

FIG. 6 is a side elevational view of a post of the atomizer head in FIG. 4 having a plurality of fibers wrapped around said post.

DETAILED DESCRIPTION OF THE INVENTION

Figure 1:
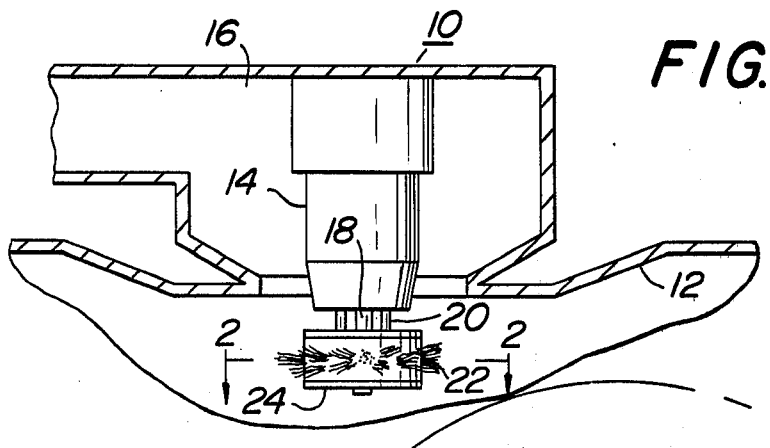
FIG. 1 is a partial side elevational view of one embodiment of the atomizer according to the present invention, as it is mounted in the center of the top wall of the spray drying chamber. In this embodiment, the fluid outlets are holes with a bundle of bristles associated with each hole.

Referring to the drawings in detail, wherein like numerals indicate like elements there is shown in FIG. 1 a spray drying apparatus 10 constructed in accordance with the present invention. For a description of a conventional spray drying system and an illustration of a spray drying chamber suitable for use with the present invention, see Bulletin 33-3 of Bowen Engineering, Inc., for example.

Spray drying apparatus 10 comprises a spray drying chamber (not completely shown), having a top wall 12, in the center of which is mounted an atomizer drive motor 14. The spray drying chamber is shaped generally like an inverted, substantially conical housing having restricted air path 16 immediately above the atomizer (the atomizer consists of atomizer drive motor 14 and atomizer head 24). The word "atomizer" as used throughout the specification and claims generally refers to the atomizer drive motor and atomizer head, but also may refer to just the atomizer head.

The atomizer head 24 is connected by motor drive shaft 18 to the motor 14. Ports 20 are provided for the introduction into the atomizer of a solution of the material from which the particles are made.

Figure 2:
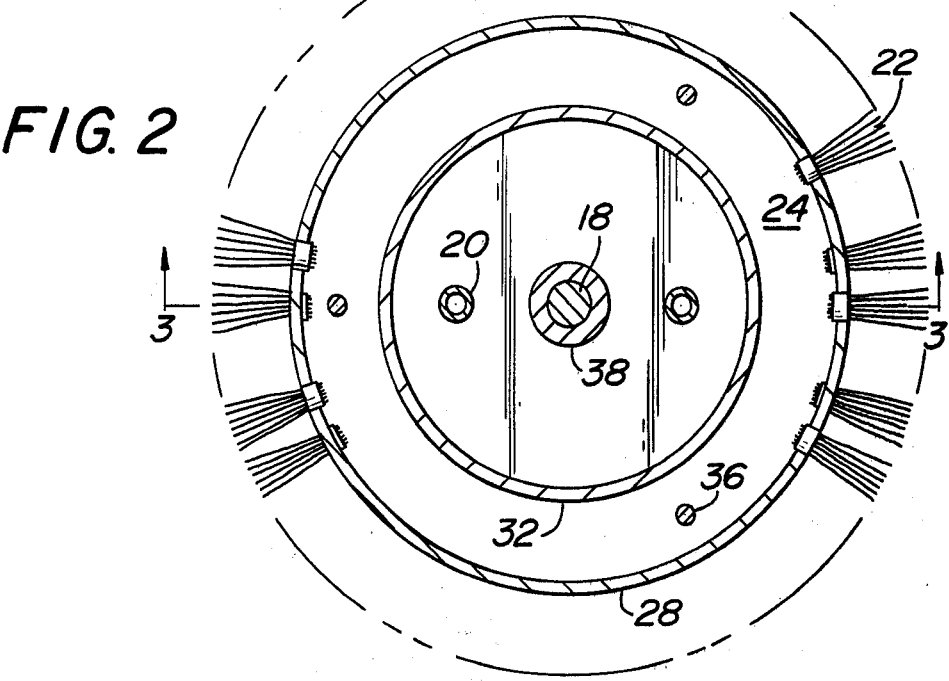
FIG. 2 is a plan view of the atomizer head of FIG. 1 taken along line 2—2 of FIG. 1.
Figure 3:
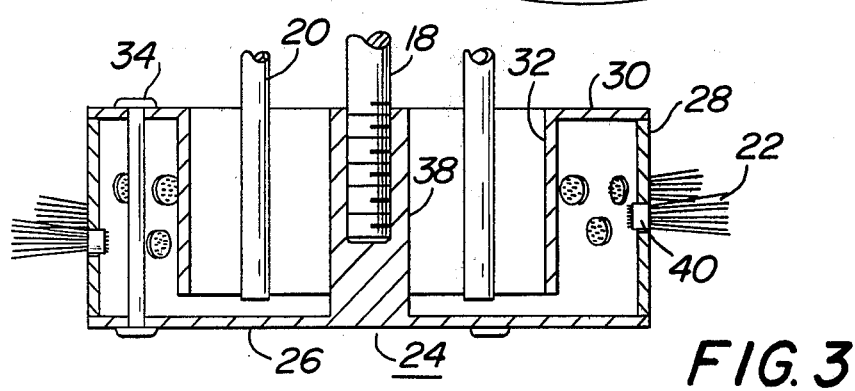
FIG. 3 is a side elevational view of the atomizer head of FIG. 1 taken in section along line 3—3 in FIG. 2.

One embodiment of the atomizer head 24 in accordance with this invention is shown more clearly in FIGS. 2 and 3. Atomizer head 24 comprises a circular bottom plate 26, a cylindrical section 28 and a top section 30. The top section 30 rests on the cylindrical section 28, which in turn rests on the bottom section 26. Bristles 22 project outwardly from outlets 40 in the cylindrical section 28. Screws 34 pass through the top section 30 and into screw holes 36 on the bottom section in order to fasten the three sections together. The top section 30 appears as an inverted "L" in a side view as shown in FIG. 3. The vertical part 32 of section 30 forms an inner-cylindrical section in the atomizer head 24 and this is best seen in FIG. 2. Part 32 does not extend totally onto bottom section 26 of the atomizer head 24 so that the fluid flows around part 32 such as to act as a baffle means. The motor drive shaft 18 is connected to the atomizer head 24 by screw means into section 38 of the bottom plate 26 of the atomizer head 24.

Another embodiment of the atomizer head in accordance with this invention is shown in FIGS. 4, 5 and 6. The atomizer head 24 comprises a circular top member 44, a slotted cylindrical ring 46 and a circular bottom member 42. The slotted cylindrical ring 46 fits into recess 58 in top section 44 and recess 60 in bottom section 42. The bottom section 42 is connected by a plurality of screws 50 passing through screw holes 48 to circular top member 44.

Bottom member 42 has a raised central threaded portion 56 into which drive motor shaft 18 is screwed in place.

A plurality of posts 52 are aligned in front of the slots in the cylindrical ring 46. Attached to these posts 52 are a plurality of fibers 54. Such fibers 54 are wrapped around the post such that each fiber forms at least two bristle ends and said wrapped fibers are stacked one on top of another. It is preferred that the bristles formed by the wrapping of the fibers be of uniform lengths.

Without wishing to be bound by any particular theory of operability, it is now generally believed that the mechanism for atomization in a porous metal atomizer such as that disclosed in U.S. Pat. No. 4,089,120 occurs as follows: (1) The liquid feed extrudes through the porous metal and emerges at its outer surface in the form of small droplets. (2) The droplets, being very small and exposed to considerable centrifugal forces, are flung from the surface of the porous metal in essentially discrete form, so that a minimum number of large particles are formed. Furthermore, little or no attenuation into jets is possible under these conditions, hence very few fine droplets are formed.

As a result, the particle size distribution of the powder produced using a porous metal atomizer in a spray dryer is narrower than that which can be achieved using conventional spinning disk atomizers. Without wishing to be bound by any particular theory of operability, the fact that all particles are not the same size probably occurs because of the following: (1) The extreme closeness of the pores in the surface of the atomizer causes agglomeration of some of the droplets before they leave its surface, resulting in the creation of larger droplets and hence larger particles in the finished powder. (2) Some of the larger droplets mentioned above are large enough to attenuate into jets, resulting in a spread of particles from large to small. (3) The pores at the surface of the atomizer are not all the same size.

In view of the above, an atomizer in accordance with the present invention was conceived whereby the liquid feed would be caused to flow along strands of bristles or fibers, for example, wires. Without wishing to be bound by any particular theory of operability it is believed that the liquid feed flows along the surface of each bristle and emerges as a droplet at the end of the bristle to be flung off such end into the chamber of the spray dryer. In an embodiment of the present invention, the bristles are strands of wire mounted radially on a hub which would be mounted to, and rotated by, a spray machine motor.

In order to obtain optimum results from the atomizer in accordance with the present invention, the following factors should be met: (1) each wire should receive an approximate equal amount of liquid feed; (2) each wire should be of the same diameter; (3) wire ends should be a certain distance apart from each other to prevent droplet agglomeration; (4) the wire size chosen should be fine enough to prevent jet formation and attenuation. The greater the adherence to the above factors, the better the success for obtaining minimum (narrow) particle size distribution.

The bristles that can be utilized in the present invention can be constructed from any material that would give it sufficient support. Such material of construction may be metallic or non-metallic. Non-limiting examples of non-metallic materials that can be employed for the bristles of the present invention include graphite fibers, plastic fibers, or plastic coated fibers.

The configuration of the bristles can be of various sizes and shapes. Non-limiting examples of such configurations include solid bristles, hollow bristles, round bristles, or non-round bristles.

In some instances the bristles may be flared at their termination points so as to avoid touching of each other or close contact. It is permissible, and sometimes even preferable, for the bristles to touch each other at the base. In fact, it may be desirable to have the bristles as close as possible at the base so as to avoid an escape means for large particles.

Without wishing to be bound by any particular theory of operability, it is felt that the diameter of each bristle and the configuration of the terminal end of each bristle are probably more critical than the bristle length. However, bristle length is one factor that is important as to the centrifugal force of the atomizer, along with the speed of rotation of the atomizer.

The operation of the atomizer will now be described. As the atomizer head begins to spin at peripheral speeds of from about 1600 to about 5000 inches per second, solution from which the macrospherical particles are made are fed into atomizer head 24 through solution feed ports 20. The feed rate is adjusted so that the solution disperses promptly. Thus, the feed rate is adjusted so that there is very little, if any, solution build-up within the atomizer head. As the droplets are propelled from the atomizer into the air currents of the spray dryer, they dry into thick-walled macrospherical particles. The spray dryer dries the droplets by evaporating water from them with a stream of heated air, although other gases could be used, having an inlet temperature, for example, of from about 450° F. to about 540° F. and outlet temperature, for examle, of about 195° F. to about 250° F. The liquid stream can be a clear solution, an emulsion, suspension, slurry or mixture.

The resulting macrospherical particles are dry and have thick walls. The walls are thick enough so that the macrospherical particles can withstand the treatments usually encountered during shipping, handling and dispensing. Anti-perspirant particles produced in accordance with this invention have a greater than unit density and typically have as great as about twice the normal density obtained from conventional spray drying. This factor is important in that very small particles, which may otherwise be respirable, settle very quickly when sprayed into the air. This counteracts the tendency to inhale the particles. Thus, not only are the particles generally large enough so that deep lung penetration is avoided, but also the smaller particles, theoretically capable of being respired deeply into the lungs settle quickly when sprayed into the air. Particles having a size less than about 15 microns in diameter are agglomerated by oils and other ingredients in the final product but, if not, the greater than unit density particles have an effective size of greater than 15 microns in diameter for purposes of respiration kinetics.

The particles are thoroughly dried in the spray dryer, the operating conditions required depending on the particular constituents of the solution from which the particles are made, but readily determinable by those skilled in the art of spray drying. Since hygroscopicity is a big factor in anti-perspirant materials, the particles should be overdried (to the extent possible without affecting anti-perspirant properties), that is, dried beyond their capacity in a metal-stable state so as to have a very high affinity for water. Since the human breathing tract has 100% relative humidity, there is high agglomeration of the smaller particles which minimizes the changes of the particles less than 15 microns in diameter actually deeply penetrating into the lungs.

After the desired quantity of spray-dried material has been produced and collected, the dryer is shut down. Using the method and apparatus of the present invention, the walls of the drying chamber generally have at most a light coating of dried, macrospherical particles. As compared to the prior art spray drying techniques, this is a distinct advantage, as the prior art devices and processes using similar operating conditions frequently result in the walls of the drying chamber being covered with a heavy, wet coating of the product being dried. Thus, according to the present invention, the amount of usable material which can be recovered from the spray drying chamber is greatly increased. Quite obviously, the operating conditions using prior art devices and processes can be varied to reduce or eliminate chamber build-up, but only at the expense of particle size, i.e., the particles produced will be too small to fall within the desired range for avoiding inhalation and deep lung penetration.

Although the macrospherical particles produced by the process and apparatus of the present invention may have many areas of utilization, such as in pigments, resins, catalysts, etc., the preferred use is in particles for anti-perspirant material. Since anti-perspirants have wide public use, it is important that the particle size be so controlled so as to reduce health hazards as much as possible. The present invention causes the particle size to fall predominantly within a narrow range of safety and effectiveness.

The solution from which the thick walled macrospherical particles of anti-perspirant material are produced may be selected from any of a wide variety of known anti-perspirant ingredients, including but not limited to basic aluminum compounds, basic aluminum zirconium complexes and mixtures thereof. Although particular compounds within the broad classes just described are known to those skilled in the anti-perspirant manufacturing art, the following more specific compositions are examples of the above-named classes of compounds.

The basic aluminum halides are examples of basic aluminum compounds suitable for use in the present invention. A representative formula is:

$$Al_n(OH)_xA_y \cdot XH_2O$$

wherein x and y need not be integers, but $x+y=3n$, X is a quantity from 2 to 4 which need not be an integer, and A is chlorine, bromine, iodine or mixtures thereof. Compounds within this general formula include the 5/6 basic aluminum halides which have the formula $[Al_2(OH)_5A]$ and the $\frac{2}{3}$ basic halides $[Al(OH)_2A]$. For convenience, brackets are used to enclose groups of chemical elements which are not necessarily all of the elements of the molecular structure, and do not mean to exclude H₂O groups.

A widely used anti-perspirant complex is aluminum chlorhydroxide or 5/6 basic aluminum chloride which is commercially available from Reheis Chemical Company division of Armour Pharmaceutical Company under the trademark "CHLORHYDROL." Many other anti-perspirant materials and additives useful in the present invention will be apparent to those of ordinary skill in the art.

The above compounds may be formed in an aqueous solution which is delivered to the atomizer. The aqueous solution contains sufficient water or other diluent to enable it to readily diffuse. Typically, a 50% by weight aqueous solution of the compounds has been found satisfactory, but if still lower viscosity is desired, the solution may be heated or may be diluted with water or alcohol to, for example, 25% by weight of the compound in the solution. As pointed out above, it is preferred that the solution should be a true solution.

It is beneficial at this point to review, briefly, those factors which affect particle size distribution of spinning-disc type atomizers. Reference is made, therefore, to "Atomization and Spray Drying" by W. R. Marshall, Jr., Chemical Engineering Process Monograph Series, Vol. 50, No. 2, 1954, American Institute of Chemical Engineers, New York, N.Y. In Chapter VIII, "Drop-Size Distribution from Spinning Disc Atomizers," the author reviews the work of various researchers in this field and shows that for a wide variety of spinning disc atomizers operated over a wide variety of conditions, drop-size distribution (and quite obviously dry particle size distribution) is a function solely of feed rate, atomizer head diameter and rotational speed. These latter two factors combined give peripheral speed. (See the above-cited reference, particularly pages 68–71 and FIGS. 98 and 100–102).

The present invention offers many advantages such as the production of smooth, free-flowing spherical particles having thicker walls and higher densities than conventionally produced particles. Also by use of the present invention, it is now possible to produce controlled spherical particles, i.e. particles having almost uniform particle size. Practicing the present invention would also allow for the production of an anti-perspirant powder capable of satisfying particle size specifications directly off the spray dryer, thus eliminating the cost and operations for grinding and air classifying.

The present invention also allows for higher throughput of macrospherical particles than conventional atomizer devices, since the present atomizer runs cleaner (fewer large particles and less particle buildup on dryer walls) and thus there is less or no need for shut-down in order to clean the atomizer. Also by using the present invention, it is now possible to produce controlled particle sizes for antacid powders for direct compression, thus eliminating the cost and associated problems of granulating.

Since the use of the present invention allows for particles to have thicker walls than those produced by conventional devices, the particle density will be increased and thus inhalation problems would be minimized. Without wishing to be limited by any particular theory of operability, it is believed that in conventional atomizers, air is sucked in so as to result in very thin walled and hollow particles having low densities. In use of the process and apparatus of the present invention, however, hollowness is minimized, thus allowing for particles having greater densities and thus fewer inhalation problems.

To demonstrate the difference between the particles produced by prior art centrifugal atomization and those produced using the apparatus and process of the present invention, several experiments were conducted using a 50% solution of "CHLORHYDROL" with the atomizer contained in a Bowen 30 inch diameter laboratory spray dryer operated at an outlet temperature of about 90° C.

EXAMPLE 1

In this example the atomizer head type utilized was a porous metal device such as that described in U.S. Pat. No. 4,089,120. The results using this atomizer type are outlined in Table 1 hereinbelow.

EXAMPLES 2–3

In Examples 2 and 3, the atomizer head that was utilized was a common 1½ inch diameter wire brush, the kind which attaches to a ¼ inch hand-held power drill normally used by homeowners and mechanics to grind rust off metal objects. This device represented a very crude embodiment of the atomizer of the present invention. Several mechanical modifications were made to the wire brush as received to make it adaptable to mounting in the spray machine of the laboratory spray dryer. The results in utilizing this wire brush device are given in Table 1 hereinbelow.

EXAMPLES 4–9

In Examples 4–9, an atomizer was utilized according to the present invention and more particularly in accordance with the embodiment shown in FIGS. 1–3. The bristles utilized in examples 4–9 were stainless steel wires. In examples 6 to 9, 0.006 inch gauge (diameter) wire was utilized for each bristle. Results for examples 4–9 are given in Table 1 hereinbelow.

EXAMPLES 10–29

In Examples 10–29, the atomizer head employed was in accordance with the embodiment shown in FIGS. 4–6. The bristles for this atomizer head were made of 0.008 inch diameter stainless steel wire. There were thirty-two (32) slots with 0.063 inch diameter posts (studs) adjacent to each slot. Twenty (20) wires were wrapped around each post with the wires stacked one on top of another to form forty (40) bristle ends (two bristle ends per wire). The total bristle height was about 0.3 inches and the bristles extended about ⅜ inch outward from each post. The posts were located on a 0.594 inch radius perimeter from the center of the atomizer head. Each post was located 10° apart from each other with no posts located at the four quadrants of the perimeter (0°, 90°, 180° and 360°). The total atomizer head measured 1⅞ inches in diameter by 0.578 inches high. The results for Examples 10–29 are given below in Table 2.

By comparing the results of Examples 10–29 (Table 2) with Example 1 (Table 1) it is clearly demonstrated that the atomizer of the present invention produces a superior particle size distribution. The cumulative weight percent greater than 64 microns for the porous metal atomizer is 11.8%, whereas the cumulative weight percent greater than 64 microns for the atomizer of the present invention as demonstrated in Examples 10–29 is no greater than 2.6%. Particles above 64 microns are undesirable since they are unattractive (gritty), and have a greater tendency to clog nozzles, tubes and other small openings commonly used in aerosol dispensers and the like.

The present invention may be embodied in other specific forms without departing from the spirit or essential attributes thereof and, accordingly, reference should be made to the appended claims, rather than to the foregoing specification, as indicating the scope of the invention.

TABLE 1

| Example No. | 1 | 2 | 3 | 4 | 5 | 6 | 7 | 8 | 9 |
|---|---|---|---|---|---|---|---|---|---|
| Atomizer Type | Porous Metal | 1½" Diameter Wire Brush | 1½" Diameter Wire Brush | Wire Bristle 2-Bristles | Wire Bristle, 4-Bristles | Wire Bristle, 8 Bristles/ Hole; 0.006 Gauge, SS Wire | Wire Bristle, 16 Bristles/ Hole; 0.006 Gauge, SS Wire | Wire Bristle, 16 Bristles/ Hole; 0.006 Gauge, SS Wire | Wire Bristle 16 Bristles/ Hole; 0.006 Gauge, SS Wire |
| Feed Rate ml/min. | 100 | 100 | 100 | 100 | 100 | 100 | 100 | 100 | 100 |
| Approx. Atomizer Speed, rpm | 20,000 | 20,000 | 20,000 | 20,000 | 20,000 | 20,000 | 20,000 | 30,000 | 40,000 |
| Approx. Atomizer Peripheral Speed, inches per second | 1,975 | 1,975 | 1,975 | 1,975 | 1,975 | 1,975 | 1,975 | 3,950 | 3,950 |
| *Particle Size Distribution of Product: Diameter Size, Microns | | | | | Cumulative Weight Percent Greater Than | | | | |
| 8.0 | 99.3 | 99.1 | 99.1 | 99.3 | 98.5 | 99.5 | 98.8 | 97.4 | 97.7 |
| 10.1 | 98.7 | 98.0 | 97.8 | 98.7 | 96.9 | 98.7 | 97.5 | 94.5 | 95.3 |
| 12.7 | 96.5 | 95.2 | 95.4 | 96.9 | 92.6 | 96.3 | 94.1 | 88.2 | 89.9 |
| 16.0 | 92.8 | 91.5 | 91.5 | 94.6 | 86.6 | 93.0 | 89.4 | 79.3 | 82.1 |
| 20.2 | 86.8 | 84.4 | 84.8 | 91.2 | 77.1 | 88.0 | 82.6 | 67.3 | 71.1 |
| 25.4 | 74.9 | 70.3 | 71.4 | 85.4 | 65.1 | 79.1 | 72.6 | 52.8 | 56.9 |
| 32.0 | 58.8 | 51.1 | 52.6 | 76.0 | 48.9 | 65.2 | 58.6 | 37.6 | 41.3 |
| 40.3 | 43.5 | 32.6 | 33.7 | 61.9 | 31.4 | 46.0 | 41.2 | 21.8 | 24.6 |
| 50.8 | 32.9 | 18.3 | 19.9 | 45.6 | 15.3 | 27.1 | 23.8 | 8.5 | 9.6 |
| 64.0 | 11.8 | 7.3 | 11.6 | 28.0 | 5.4 | 11.1 | 9.0 | 1.9 | 1.6 |
| 80.6 | 8.0 | 2.3 | 7.8 | 17.8 | 3.6 | 1.9 | 1.4 | 0.5 | 0.2 |

*Determined by Coulter Counter

TABLE 2

| Example No. | 10 | 11 | 12 | 13 | 14 | 15 | 16 | 17 | 18 | 19 |
|---|---|---|---|---|---|---|---|---|---|---|
| Atomizer Type | Stacked Bristles Wrapped Around Post | Stacked Bristles Wrapped Around Post | Stacked Bristles Wrapped Around Post | Stacked Bristles Wrapped Around Post | Stacked Bristles Wrapped Around Post | Stacked Bristles Wrapped Around Post | Stacked Bristles Wrapped Around Post | Stacked Bristles Wrapped Around Post | Stacked Bristles Wrapped Around Post | Stacked Bristles Wrapped Around Post |
| Feed Rate ml/min. | 100 | 100 | 100 | 100 | 100 | 100 | 100 | 75 | 75 | 75 |
| Atomizer Speed, rpm | 30,400 | 29,500 | 26,600 | 24,550 | 22,500 | 19,200 | 16,800 | 30,400 | 29,500 | 26,500 |
| Atomizer Peripheral Speed, inches/second | 3,000 | 2,910 | 2,625 | 2,420 | 2,220 | 1,895 | 1,660 | 3,000 | 2,910 | 2,615 |
| *Particle Size Distribution of Product: Diameter Size, Microns | | | | | Cumulative Weight Percent Greater Than | | | | | |
| 3.17 | — | — | — | — | — | — | — | — | — | — |
| 4.00 | — | — | — | — | — | — | — | — | — | — |
| 5.04 | 100 | 100 | 100 | 100 | 100 | 100 | 100 | 100 | 100 | 100 |
| 6.35 | 98.8 | 98.9 | 98.9 | 98.8 | 98.8 | 99.2 | 99.5 | 99.0 | 99.2 | 99.1 |
| 8.00 | 96.5 | 96.2 | 96.3 | 96.0 | 96.7 | 96.5 | 97.6 | 95.9 | 96.8 | 96.5 |
| 10.08 | 93.3 | 93.7 | 93.7 | 93.6 | 93.6 | 95.0 | 96.4 | 92.9 | 94.6 | 94.3 |
| 12.70 | 87.2 | 88.4 | 88.3 | 89.4 | 89.1 | 90.8 | 92.9 | 86.7 | 89.6 | 89.4 |
| 16.00 | 75.9 | 78.3 | 78.3 | 82.0 | 82.0 | 84.9 | 87.6 | 76.2 | 80.9 | 80.7 |
| 20.20 | 61.5 | 64.2 | 62.8 | 68.9 | 69.5 | 75.7 | 79.4 | 62.5 | 68.1 | 67.4 |
| 25.40 | 44.5 | 47.3 | 44.3 | 51.2 | 50.1 | 59.4 | 66.4 | 45.8 | 51.7 | 50.3 |
| 32.00 | 27.9 | 31.0 | 26.6 | 32.5 | 29.6 | 37.0 | 46.8 | 28.8 | 34.2 | 32.4 |
| 40.30 | 12.4 | 16.2 | 13.0 | 17.7 | 14.1 | 17.6 | 24.4 | 12.7 | 16.4 | 16.1 |
| 50.80 | 3.1 | 5.5 | 3.6 | 7.1 | 4.7 | 6.5 | 8.9 | 2.9 | 4.5 | 5.1 |
| 64.00 | 0.6 | 1.5 | 0.5 | 1.4 | 0.9 | 1.4 | 2.1 | 0.6 | 0.6 | 0.9 |
| 80.60 | 0.0 | 0.5 | 0.0 | 0.5 | 0.0 | 0.5 | 0.0 | 0.5 | 0.0 | 0.0 |
| 101.60 | 0.0 | 0.0 | 0.0 | 0.0 | 0.0 | 0.0 | 0.0 | 0.0 | 0.0 | 0.0 |
| 128.00 | 0.0 | 0.0 | 0.0 | 0.0 | 0.0 | 0.0 | 0.0 | 0.0 | 0.0 | 0.0 |
| Chamber Buildup | Moderate | Moderate | Moderate | Heavy | Heavy | Heavy | Heavy | Light** | Light** | Moderate-Light |

| Example No. | 20 | 21 | 22 | 23 | 24 | 25 | 26 | 27 | 28 | 29 |
|---|---|---|---|---|---|---|---|---|---|---|
| Atomizer Type | Stacked Bristles Wrapped Around Post | Stacked Bristles Wrapped Around Post | Stacked Bristles Wrapped Around Post | Stacked Bristles Wrapped Around Post | Stacked Bristles Wrapped Around Post | Stacked Bristles Wrapped Around Post | Stacked Bristles Wrapped Around Post | Stacked Bristles Wrapped Around Post | Stracked Bristles Wrapped Around Post | Stacked Bristles Wrapped Around Post |

TABLE 2-continued

| Feed Rate ml/min. | 75 | 75 | 75 | 75 | 50 | 50 | 50 | 50 | 50 | 50 |
|---|---|---|---|---|---|---|---|---|---|---|
| Atomizer Speed, rpm | 24,550 | 22,500 | 19,200 | 16,800 | 30,400 | 29,500 | 26,600 | 24,550 | 22,500 | 19,200 |
| Atomizer Peripheral Speed, inches/second | 2,420 | 2,220 | 1,895 | 1,660 | 3,000 | 2,910 | 2,625 | 2,420 | 2,220 | 1,895 |
| *Particle Size Distribution of Product: Diameter Size, Microns | | | | | Cumulative Weight Percent Greater Than | | | | | |
| 3.17 | — | — | — | — | — | — | — | — | — | — |
| 4.00 | — | — | — | — | — | — | — | — | — | — |
| 5.04 | 100 | 100 | 100 | 100 | 100 | 100 | 100 | 100 | 100 | 100 |
| 6.35 | 99.0 | 98.9 | 99.1 | 99.6 | 98.6 | 98.4 | 99.2 | 99.2 | 98.8 | 99.4 |
| 8.00 | 97.5 | 96.9 | 96.8 | 98.4 | 94.8 | 96.0 | 96.8 | 96.9 | 95.4 | 97.2 |
| 10.08 | 95.2 | 94.4 | 95.0 | 97.6 | 91.5 | 92.8 | 94.4 | 94.9 | 92.7 | 95.6 |
| 12.70 | 90.7 | 90.1 | 90.7 | 95.2 | 84.1 | 85.3 | 88.6 | 90.2 | 87.2 | 91.8 |
| 16.00 | 83.2 | 83.3 | 85.4 | 92.1 | 72.1 | 71.0 | 78.1 | 81.8 | 77.9 | 86.3 |
| 20.20 | 70.3 | 71.2 | 77.0 | 87.1 | 56.2 | 52.3 | 62.3 | 67.1 | 62.3 | 77.2 |
| 25.40 | 53.3 | 53.4 | 62.0 | 77.9 | 38.1 | 32.7 | 43.0 | 47.5 | 42.4 | 60.1 |
| 32.00 | 35.4 | 32.1 | 41.1 | 59.3 | 21.2 | 17.4 | 24.0 | 27.1 | 23.5 | 28.3 |
| 40.30 | 19.8 | 16.0 | 21.0 | 33.0 | 7.2 | 6.8 | 10.7 | 13.0 | 10.6 | 18.3 |
| 50.80 | 7.6 | 5.5 | 8.8 | 11.4 | 1.0 | 1.5 | 3.1 | 4.1 | 8.8 | 6.9 |
| 64.00 | 1.6 | 0.7 | 2.4 | 2.6 | 0.2 | 0.2 | 0.4 | 0.9 | 1.6 | 1.3 |
| 80.60 | 0.4 | 0.0 | 0.2 | 0.0 | 0.0 | 0.0 | 0.0 | 0.0 | 0.9 | 0.0 |
| 101.60 | 0.0 | 0.0 | 0.0 | 0.0 | 0.0 | 0.0 | 0.0 | 0.0 | 0.5 | 0.0 |
| 128.00 | 0.0 | 0.0 | 0.0 | 0.0 | 0.0 | 0.0 | 0.0 | 0.0 | 0.2 | 0.0 |
| Chamber Buildup | Moderate | Moderate-Heavy | Heavy | Heavy | Light** | Light** | Light** | Moderate | Moderate | Heavy |

*Determined by Coulter Counter
**Light chamber buildup is preferred

We claim:

1. A process for producing dry, thick-walled macrospherical particles of controlled particle size distribution comprising providing a solution from a generally centrally located source, said solution containing material from which said particles are made, dispersing said solution outwardly along a plurality of radially disposed bristles by centrifugal force to form discrete liquid droplets and drying said droplets in a stream of heated gas to form said particles after said droplets leave the free ends of said bristles.

2. The process according to claim 1 wherein said solution comprises aluminum chloride.

3. A spray drier having a spray drying chamber for producing particles from a solution containing material from which said particles are made comprising a centrifugal atomizer, wherein said atomizer comprises an atomizer head comprising one or more fluid inlets for receiving said solution from a generally centrally located source, one or more fluid outlets and a plurality of bristles extending radially outward from each of said fluid outlets, and drive means attached to said atomizer head for rotating said atomizer at high peripheral speeds, said atomizer mounted in said spray drying chamber to receive solution droplets from the outward bristle ends and produce dry, thick-walled macrospherical particles of controlled particle size distribution.

4. The apparatus according to claim 3 wherein said plurality of bristles are in the form of a brush.

5. The apparatus according to claim 3 wherein said plurality of bristles is formed by a plurality of fibers wrapped around a post such that each fiber forms two bristle ends.

6. The apparatus according to claim 5 wherein said fibers are vertically stacked one on top of another.

7. The apparatus according to claim 3 wherein said bristles are wires.

8. The apparatus according to claim 3 wherein said atomizer further comprises baffle means positioned upstream of said fluid outlets.

* * * * *

UNITED STATES PATENT AND TRADEMARK OFFICE
CERTIFICATE OF CORRECTION

PATENT NO. : 4,430,155

DATED : February 7, 1984

INVENTOR(S) : James F. Kozischek and M. Donner Martin, Jr.

It is certified that error appears in the above-identified patent and that said Letters Patent is hereby corrected as shown below:

Col. 3, Line 46, delete "microspherical" and substitute --macrospherical--.

Col. 4, Line 16, delete "invkention" and substitute --invention--.

Col. 8, Line 9, delete "metal-stable" and substitute --meta-stable--.

Col. 8, Line 13, delete "changes" and substitute --chances--.

Claim 2,
Col. 13, Line 40, insert --basic-- after the word "comprises".

Signed and Sealed this

Twenty-ninth Day of May 1984

[SEAL]

Attest:

GERALD J. MOSSINGHOFF

Attesting Officer

Commissioner of Patents and Trademarks